United States Patent [19]
Linnett et al.

[11] Patent Number: 5,682,469
[45] Date of Patent: Oct. 28, 1997

[54] SOFTWARE PLATFORM HAVING A REAL WORLD INTERFACE WITH ANIMATED CHARACTERS

[75] Inventors: Barry J. Linnett, Seattle; Karen E. Fries, Duvall; Lawrence H. Powelson, Bellevue, all of Wash.

[73] Assignee: Microsoft Corporation, Redmond, Wash.

[21] Appl. No.: 272,691

[22] Filed: Jul. 8, 1994

[51] Int. Cl.⁶ ................................................. G06T 13/00
[52] U.S. Cl. ......................... 395/173; 395/334; 395/336
[58] Field of Search .................................. 395/152, 154, 395/156, 161, 173, 333–334, 336, 338, 352, 949, 950, 956, 957, 960; 273/434; 345/122; 463/1, 30–32; 434/118, 307 R

[56] References Cited

U.S. PATENT DOCUMENTS

| | | | |
|---|---|---|---|
| 4,569,026 | 2/1986 | Best | 395/152 |
| 4,878,844 | 11/1989 | Gasper et al. | 434/159 |
| 4,884,972 | 12/1989 | Gasper | 434/185 |
| 5,083,262 | 1/1992 | Haff, Jr. | 395/500 |
| 5,101,364 | 3/1992 | Davenport et al. | 395/152 |
| 5,111,409 | 5/1992 | Gasper et al. | 395/152 |
| 5,239,464 | 8/1993 | Blair et al. | 364/410 |
| 5,267,154 | 11/1993 | Takeuchi et al. | 364/419.2 |
| 5,287,448 | 2/1994 | Nicol et al. | 395/159 |
| 5,358,259 | 10/1994 | Best | 273/434 |
| 5,377,319 | 12/1994 | Kitahara et al. | 395/161 |
| 5,377,997 | 1/1995 | Wilden et al. | 273/434 |
| 5,390,281 | 2/1995 | Luciw et al. | 395/12 |
| 5,434,965 | 7/1995 | Matheny et al. | 395/159 |
| 5,483,632 | 1/1996 | Kuwamoto et al. | 395/156 |
| 5,498,003 | 3/1996 | Gechter | 463/31 |
| 5,517,663 | 5/1996 | Kahn | 395/800 |

FOREIGN PATENT DOCUMENTS

| | | |
|---|---|---|
| 0438017 | 7/1991 | European Pat. Off. |
| 0562995 | 9/1993 | European Pat. Off. |
| WO 93/03453 | 2/1993 | WIPO |

OTHER PUBLICATIONS

Nintendo of America, Inc., "Super Mario Bros. 2" instruction booklet, pp. 1–30, 1989.

Massey, Rebecca, "Lotus 1–2–3 for Windows with Multimedia SmartHelp", CD–ROM Professional, pp. 26–32, May 1993.

Grevstad, "Catch the WAV with Two Windows Sound Packages", *Computer Shopper* V13 n4, Apr. 1993, p. 793.

*Microsoft® PublisherDesktop Publishing Program Version 2.0 Windows™ Series—User's Guide*, 1993, pp. 44–45, Microsoft Corporation.

Bank, David, General Magic Will Make E–Mail Act "Intelligent," Dec. 15, 1993, Business Section, p. 1F, San Jose Mercury News.

Lee, Yvonne L., General Magic's PDA Interface Comes to Life with Realistic Objects, Jun. 28, 1993, vol. 15, Issue 26, Cover, p. 163, Info World.

Flynn, Laurie, It's No Secret: "Agents" Might Ease Your Life Think of Agents as Digital, Jun. 6, 1993, Computing Section, p. 1F, San Jose Mercury News.

Bates, Joseph et al., *An Architecture for Action, Emotion, and Social Behavior*, Jul. 29–31, 1992, pp. 55–68, Artificial Social Systems—4th European Workshop . . . Italy (selected papers).

(List continued on next page.)

*Primary Examiner*—Joseph H. Feild
*Attorney, Agent, or Firm*—Jones & Askew, LLP

[57] ABSTRACT

A software development platform generates a user interface that adopts a real world metaphor. In particular, the user interface appears to a user as containing rooms of a home. The user can specify what rooms are to be included in the home and can specify the style of the appearance of the rooms of the home. The user interface serves as a vehicle for the user to invoke applications and perform tasks. The user interface also generates a personal character for each user. The personal character is an animated guide that helps to assist the user in using the computer. Specialized characters may also be provided to perform specialized tasks.

7 Claims, 20 Drawing Sheets

OTHER PUBLICATIONS

Bates, Joseph et al., *An Architecture for Action, Emotion, and Social Behavior*, May 1992, CMU–CS–92–144, School of Computer Science, Carnegie Mellon University, pp. 1–14.

Bates, Joseph, *The Nature of Characters in Interactive Worlds and The Oz Project*, Oct. 1992, CMU–CS–92–200, School of Computer Science, Carnegie Mellon University, pp. 1–7.

Bates, Joseph et al., *Broad Agents*, vol. 2, No. 4, 1991 pp. 38–40, Sigart Bulletin, School of Computer Science, Carnegie Mellon University.

Bates, Joseph, *Deep Structure for Virtual Reality*, May 1991, CMU–CS–91–133, School of Computer Science, Carnegie Mellon University, pp. 1–8.

Bates, Joseph et al., *Integrating Reactivity, Goals, and Emotion in a Broad Agent*, May 1992, CMU–CS–92–142, School of Computer Science, Carnegie Mellon University, pp. 1–13.

Loyall. A. Bryan et al., *Hap A reactive, Adaptive Architecture for Agents*, Jun. 24, 1991, CMU–CS–91–147, School of Computer Science, Carnegie Mellon University, pp. 1–12.

Reilly, Scott W. and Bates, Joseph, *Building Emotional Agents*, May 1992, CMU–CS–92–143, School of Computer Science, Carnegi Mellon University, pp. 1–13.

*Clifford Nass and Byron Reeves: A Bibliography*, Aug. 23, 1995, Microsoft Information Services—Library, pp. 1–13.

WordPerfect's Main Street Product Line, Apr. 11, 1994, Business Wire, WordPerfect Corp., Orem.

Apple Demonstrates Prototype of Voice Computer, Mar. 1, 1992, ISSN: 0891–303X, Technical Computing.

Macintosh Responds to Spoken Commands, Mar. 4, 1992, ISSN: 0300–757X, Inside R&D, Apple Computer Inc., Cupertino, CA.

Newsbytes News Network, WordPerfect Ships More Main Street Titles, Oct. 11, 1994, IntelliSeek for Business, Jul. 1995.

WordPerfect Main Street Ships 19 Products to Introduce Consumer Product Line . . . , Apr. 11, 1994, Business Wire, WordPerfect Corp., Orem.

Graphic Office Interface, Jun. 1991, vol. 34, No. 1, pp. 266–269, IBM Technical Disclosure Bulletin, Armonk, NY.

SOFTWARE PLATFORM HAVING A REAL WORLD INTERFACE WITH ANIMATED CHARACTERS

TECHNICAL FIELD

The present invention relates generally to data processing systems and, more particularly, to software development platforms in data processing systems.

BACKGROUND OF THE INVENTION

Many conventional software products provide user interfaces that are difficult to use. These user interfaces are particularly difficult for novice users to use. Such novice users often feel intimidated by the user interfaces. Unfortunately, a user must typically undergo extensive training before he feels comfortable using the user interfaces of such software products.

SUMMARY OF THE INVENTION

The shortcomings of the user interfaces of the prior art are overcome by the present invention. In accordance with the first aspect of the present invention, a method is practiced in a data processing system having a video display, a storage for storing computer programs, a processor for running the computer programs and a system level service for displaying at least one animated character on the video display. The computer programs include an application program and a program for displaying a system user interface from which the application program may be invoked. In accordance with this method, the program for displaying the system user interface is run on the processor. While the program is run, an animated character is displayed on the video display via the system level service. Assistance is provided to the user via the animated character. When running the application program on the processor, the animated character is displayed on the video display via the system level service. Assistance is provided to the user via the animated character.

In accordance with an additional aspect of the present invention, a method is practiced in a data processing system having a processor for running computer programs, storage for storing the computer programs and a video display. In this method, a current user is provided with a selection of personal characters from which the user may choose. In response to a choice by the user of a desired personal character, a character selected by the user is assigned to the user. Whenever any of the computer programs are run, the desired personal character is displayed on the video display for the current user and assistance is provided to the current user through the personal character.

In accordance with another aspect of the present invention, a method is practiced in a data processing system having a video display. In this method, an animated personal character is provided for a user. The animated personal character is displayed on the video display to assist the user in using the data processing system. A specialized task is invoked within the data processing system. When the specialized task is invoked, the personal character is replaced with an animated specialized character. The animated specialized character is displayed on the video display and provides assistance to the user for the specialized task.

In accordance with a still further aspect of the present invention, a method is practiced in a data processing system having a video display and a character editor. In the method, the character editor is used to interactively create a personal character for a user. The character created using the character editor is displayed on the video that is displayed to assist the user in using the data processing system.

DETAILED DESCRIPTION OF THE INVENTION

A preferred embodiment of the present invention provides a software development platform that provides a friendly and intuitive user interface. The user interface provided by the software development platform adopts a real world metaphor so that it is readily recognizable to users and not intimidating to novice users. The user interface helps to minimize the time required to learn to use the computer and also helps to demystify the computer to novice users. The user interface presents the user with an environment that resembles rooms of a house and provides each user with a personal character that serves as a guide and assistant.

Figure 1:
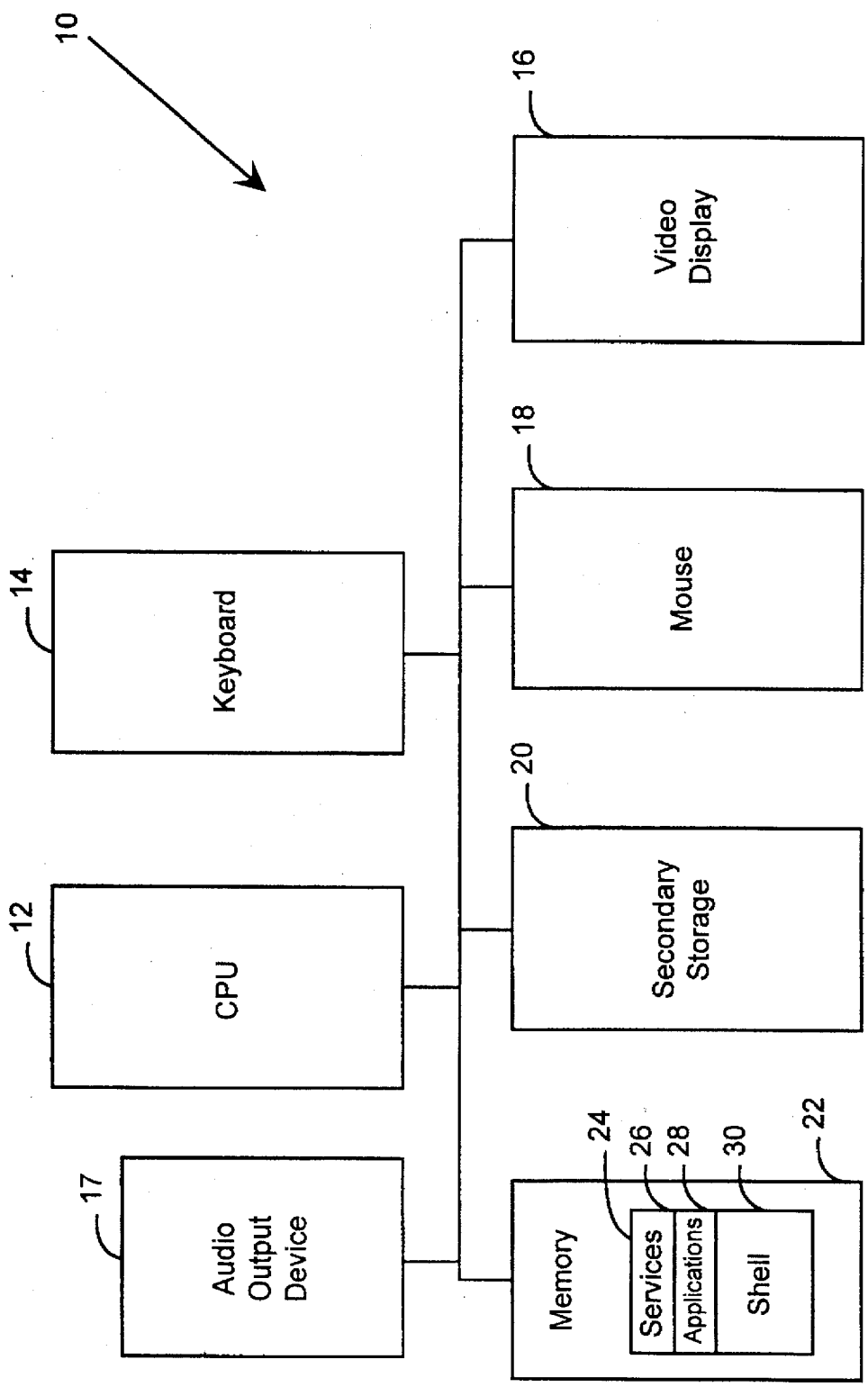
FIG. 1 is a block diagram of a data processing system that is suitable for practicing a preferred embodiment of the present invention.

FIG. 1 is a block diagram of a data processing system 10 that is suitable for practicing the preferred embodiment of the present invention. The data processing system 10 includes a central processing unit (CPU) 12 for controlling operation of the data processing system 10 and a number of peripheral devices, including a keyboard 14, a video display 16, an audio output device 17, a mouse 18, a secondary storage device 20, and a memory 22.

Those skilled in the art will appreciate that the data processing system 10 of FIG. 1 is intended to be merely illustrative and that the present invention may also be practiced in other environments, such as in an electronic wallet or an intelligent television set.

The memory 22 holds the software development platform 24 of the preferred embodiment of the present invention. The software development platform 24 includes three modularized components: services 26, applications 28 and a shell 30. These three components 26, 28 and 30 will be described in more detail below.

The software development platform 24 may be viewed as a hybrid between an operating system and a software suite. It provides functionality that resembles an operating system through the services 26 and the shell 30. On the other hand, the software development platform 24 provides functionality that resembles a suite in that it provides a number of different applications 28 to the user.

Those skilled in the art will appreciate that the present invention may be practiced on data processing configurations that differ from that depicted in FIG. 1. The data processing system depicted in FIG. 1 is intended merely to be illustrative. Those skilled in the art will also appreciate that the services 26, applications 28 and shell 30 may be implemented in a number of different ways, including as objects that comply with the component object model set forth in the OLE 2.0 protocol of Microsoft Corporation of Redmond, Wash..

In order to fully understand the preferred embodiment of the present invention, it is helpful to first introduce a few relevant concepts. One such concept is the notion of an "object". An object is a logical structure that includes data structures for holding data. An object may include functions that operate on the data held in the data structures. An object, in some instances holds only data and does not hold any functions.

Another concept that is utilized in the preferred embodiment of the present invention is an "interface". An interface is a named set of logically-related functions that allow, for example, a user to access the services 26 and applications 20. An interface lists signatures, such as parameters, for a set of functions. An interface does not provide code for implementing functions; rather, the code for implementing functions is provided by objects. Objects that provide the code for implementing such functions of an interface are said to "support" the interface. The code provided by an object that supports an interface must comply with the signatures that are set forth in the interface definition. In the C++ programming language, an interface is a set of virtual functions.

The services 26 provide functionality that may be called by clients, such as applications 28 or the shell 30. In the preferred embodiment of the present invention, the services 26 are implemented as OLE 2.0 component objects. They provide services to clients by making instances of interfaces (that they support) available to clients. Component objects are described in more detail in "Inside OLE 2," by Kraig Brockschmidt, Microsoft Press, 1994. Examples of what is a service 26 will be given below.

The applications 28 are oriented to specialized tasks rather than to generalized functions. For example, in some implementations, the applications 28 may include a letter writer for writing letters and a resume writer for writing resumes rather than including a word processing application for performing both such tasks. The task-oriented nature of the applications 28 makes it easier for the user to decide which application to use to perform a given task.

The applications 28 are developed to encourage personal interaction between the user and characters. As will be described in more detail below, the characters serve as assistants that aid the user in performing tasks. The characters are designed to encourage social interaction with the user. The applications 28 interact with the user via the user interface elements, such as the personal character, that are also utilized in the shell. The applications 28 appear in the shell 30 as objects that can be organized, modified or launched. The applications 28 take advantage of the services 26 provided by the software development platform 24 to present the user with a consistent and readily recognizable user interface.

The shell 30 is analogous to an operating system shell. The shell 30 provides a user interface to the user that allows the user access to the applications 28 and services 26. As was mentioned above, the shell 30 provides a user interface that has a real world metaphor. The user interface resembles one or more rooms of a house. Each room contains objects that may be manipulated to perform a desired task. The objects are intuitively assigned to assist the user in performing tasks. For example, to invoke a calendar program, the user merely needs to double-click the mouse 18 on a graphical calendar object that has the appearance of a calendar.

Figure 2:
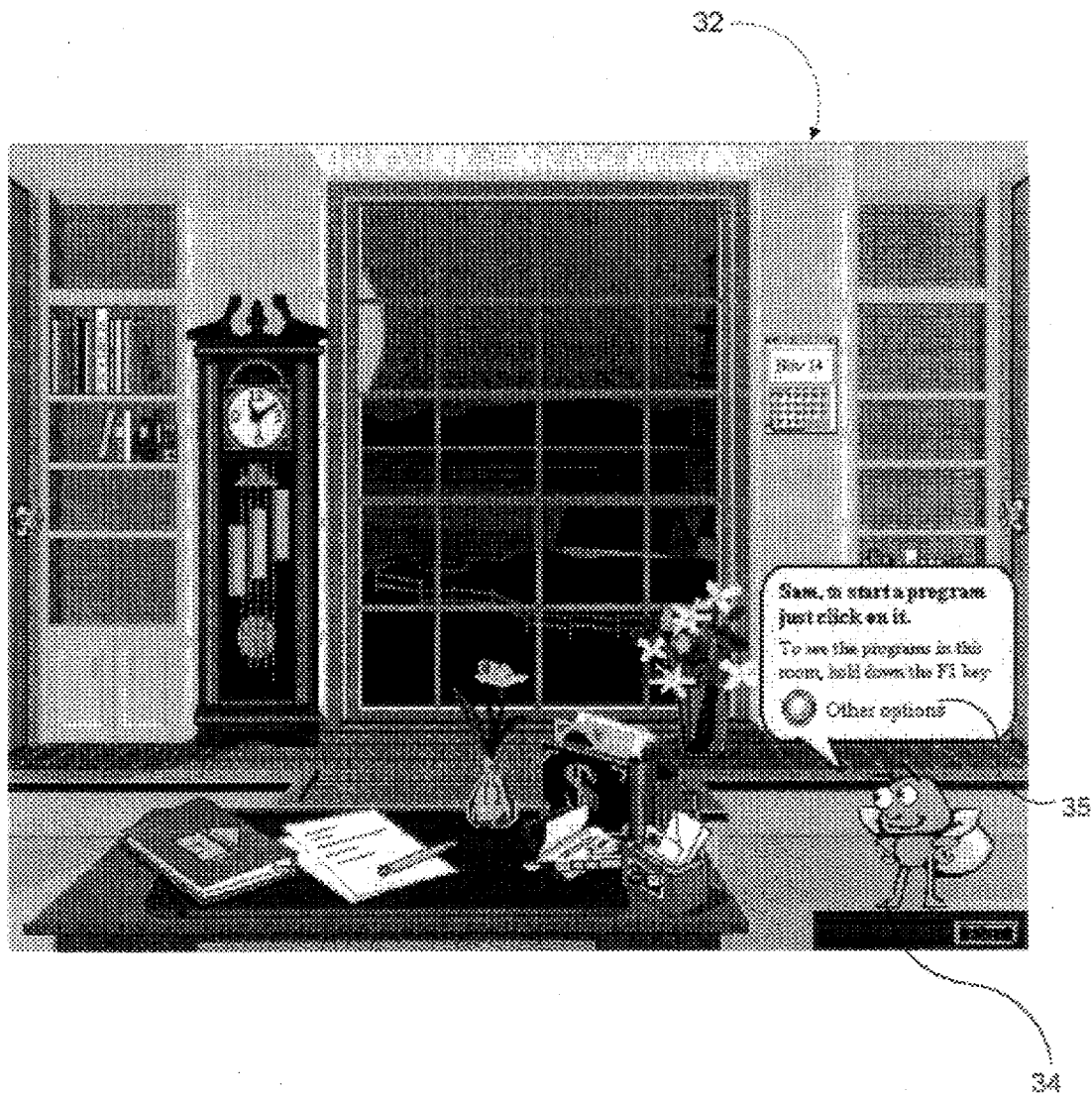
FIG. 2 is a diagram of a contemporary style study as provided by the preferred embodiment of the present invention.

In order to understand the user interface provided by the shell 30, it is helpful to examine an example. The user interface includes two primary elements: characters and rooms. FIG. 2 shows an example of a room 32 that is provided by the shell 30. The room 32 is a screen that is displayed on the video display 16. The room 32 shown in FIG. 2 is one of many rooms that may be provided the shell 30. The user interface shown in FIG. 2 also includes a personal character 34 that provides the user with assistance in using the data processing system 10.

The use of characters within the preferred embodiment of the present invention and the use of the interface that resembles one or more rooms of a home in the preferred embodiment of the present invention will be described in more detail below. The discussion initially focuses on the use of characters and then later focuses on the use of the interface that resembles rooms of a house.

Each user is assigned a "personal character." The character is "personal" in that it is assigned on a per-user basis. Nevertheless, different users may be assigned a same personal character. The user may choose a personal character or have a default personal character assigned. The shell 30 provides a user interface that allows a user to choose a personal character or change a personal character. The personal character provides the user with a tool that assists the user in performing tasks. The user interacts with the personal character in a social fashion as if the character were another person. The personal character of a user is continuously present (except in a few instances) to help the user in performing tasks. Examples of actions that the personal character may perform include personally greeting a user, telling the user what the user can and cannot do, providing expertise on matters related to using the computer and informing the user of important events and engagements.

As shown in FIG. 2, the personal character 34 is consistently shown on the video display 16 in the lower right-hand corner in the preferred embodiment of the present invention. Alternatively, the personal character may move about the screen in some embodiments of the present invention. Moreover, in some alternative embodiments, the personal character may appear and disappear based on user actions or system events. The personal character 34 often provides assistance to the user by displaying speech balloons (see balloon 35 in FIG. 2). The speech balloons present the user with text that contains helpful information and/or controls that allow the user to perform tasks. For example, speech balloon 25 includes the text: "Greetings, Sam", the "Start an activity" button control and the "Other options" button control. Alternatively, the speech balloon may include text but not controls. The controls may be relegated to a separate menu or other user interface element.

Each personal character may perform a number of different animations. Each personal character has its own "personality" that is reflected in its animations. The personality of the character is also reflected in the contents of its speech balloons and generally in its interactions with the user. At any point in time a user may replace a personal character with another personal character whose behavior and personality are more to the liking of the user.

Figure 3:
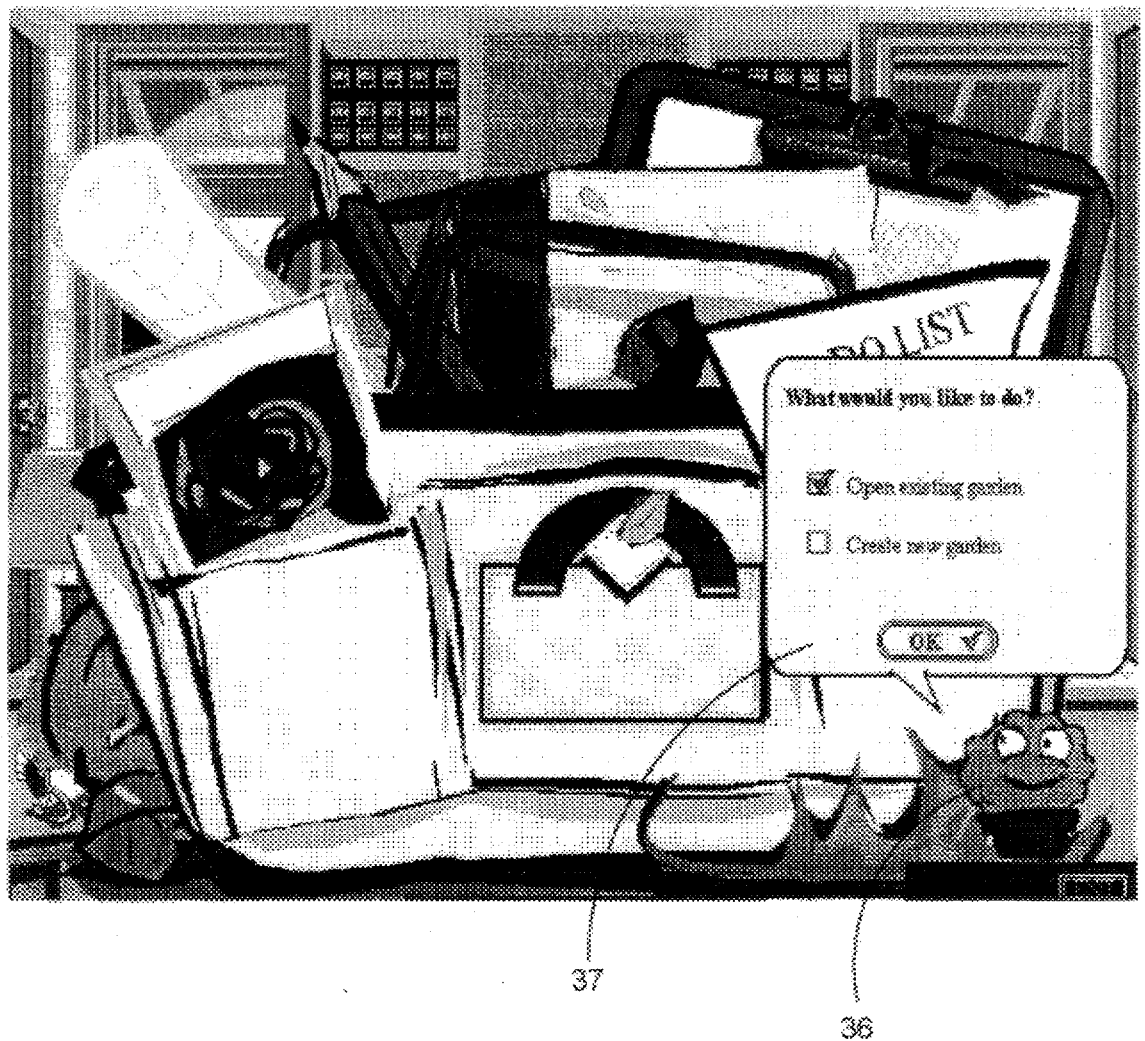
FIG. 3 is a diagram illustrating an example specialist character in an application program according to the preferred embodiment of the present invention.

"Specialist characters" are also provided in the preferred embodiment. Specialist characters are similar to personal characters, but specialist characters appear only when the user is performing a specialized task. Each specialist character has a personality and a demeanor that is well suited for its specialized task. Moreover, its vocabulary is especially adapted for the task at hand and it may have a greater helpfulness index to provide the user with a greater amount of assistance than the personal character. The specialist character is an expert that helps the user to better perform a critical specialized task. For example, FIG. 3 shows an example of a plant specialist character 36 who appears in a gardening application program. She provides advice and options via speech balloon 37. A specialist character may have greater credibility and is provided to gain the trust of the user in performing a specialized task. A specialist character replaces the personal character of a user when the specialized task is to be performed. When the specialized task is completed, the personal character returns to replace the specialist character. Thus, a user may have available a whole family of characters that include his personal character as well as a number of specialist characters. A specialist character is generally created and controlled by an application 28.

In an alternative embodiment, the personal character is not replaced but, rather, the appearance of the personal character changes. For example, if the user invokes a spreadsheet program, the personal character might don a green visor, change his vocabulary and be more helpful than usual.

Figure 4:
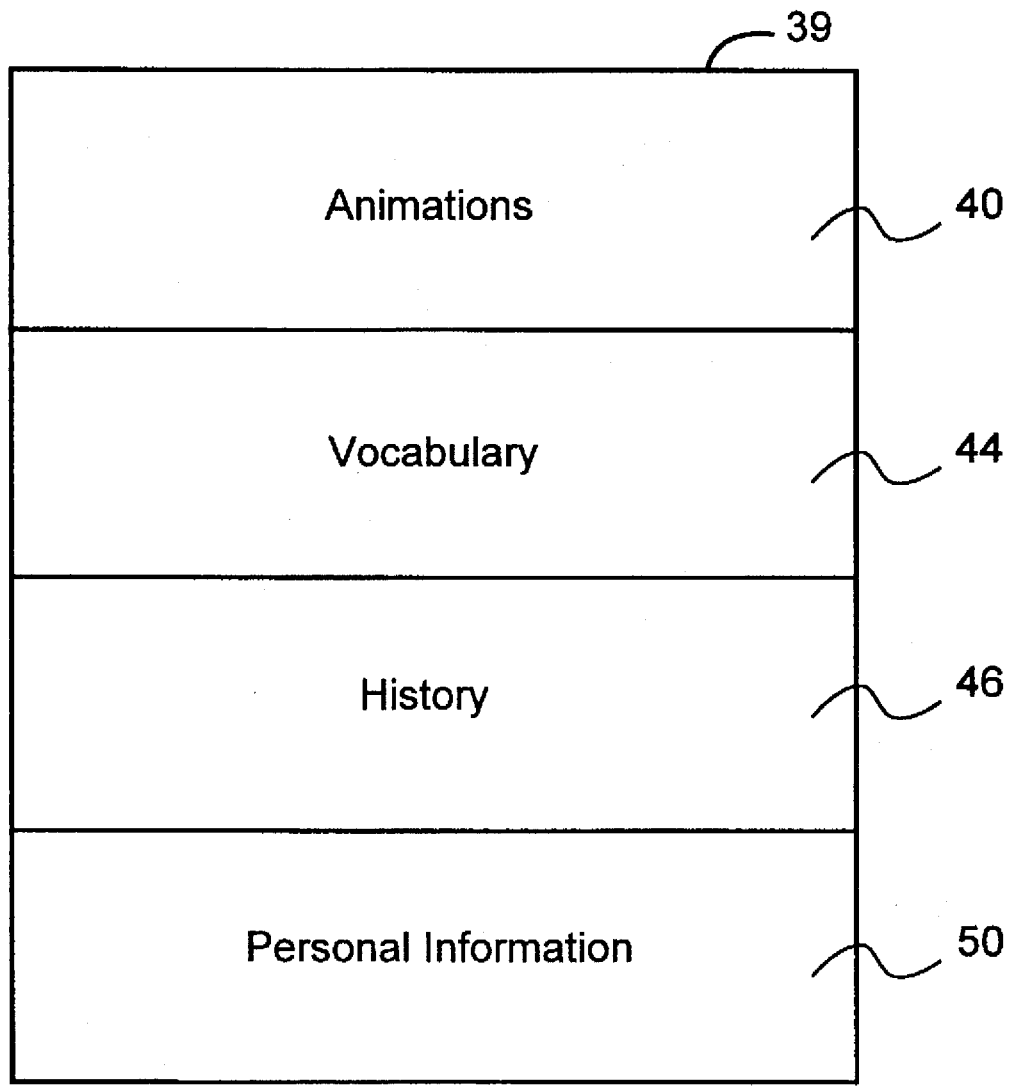
FIG. 4 is a diagram illustrating the components of a data file for a character in accordance with the preferred embodiment of the present invention.

For each character (e.g., each personal character or each specialist character), the software development platform 24 stores a data file 39 that describes critical characteristics of the character. Those skilled in the art will appreciate that the data may be stored in multiple files rather than a single file. The data stored in the data file 39 is used to generate actions by the character, as will be described in more detail below. FIG. 4 illustrates the major types of data that are stored in the data file 39 for each character. In the preferred embodiment, each instance of a character is an object that supports interfaces for performing tasks. Application program interfaces (APIs) are provided to allow applications 28 to use such characters. Those skilled in the art will appreciate that other types of data may also be stored in file 39. Animations 40 that may be performed by the characters are stored as metafiles or bitmaps in the data file 39. For example, an animation illustrating the personal character jumping up and down, an animation illustrating the character sleeping and an animation illustrating the character pacing may also be stored in the data file 39.

Vocabulary data 44 is also stored in the file 39. The vocabulary data 44 is a table of vocabulary snippets that may be used to form text contained within character speech balloons. Examples of vocabulary snippets include a snippet for the character's name, a snippet for introducing the character, a snippet for greeting a user, a snippet for providing a farewell and a snippet for sounding an alarm. Those skilled in the art will appreciate that other snippets may also be stored in the vocabulary data 44. All characters need not have the same vocabulary. In fact, preferably, each character has a unique vocabulary.

History data 46 is stored for each character. The history data 46 includes a snapshot of the character and personal information. The snapshot is a bitmap or metafile that depicts the character. The personal information includes the name, sex, hometown, a helpfulness index (in the range of 0–6) and other attributes. The helpfulness index is a quantitative value that indicates how likely the character is to provide instructions to the user. Certain characters are designed to be more helpful than others, as reflected in larger values for their helpfulness indices. Characters with different degrees of helpfulness are provided to better suit the needs and personalities of users.

Lastly, code 50 may be stored in the data file 39. The code 50 provides added functionality for the character. The code 50 is optional and is used to enhance the capabilities of the character. For example, code may be provided to track user actions. By tracking user actions, the character is more likely to be able to anticipate a user's needs and to help the user avoid common pitfalls. In addition, the code 50 may provide added functionality, such as voice recognition, voice activation and other intelligence that enhances the capabilities of the character.

Figure 5:
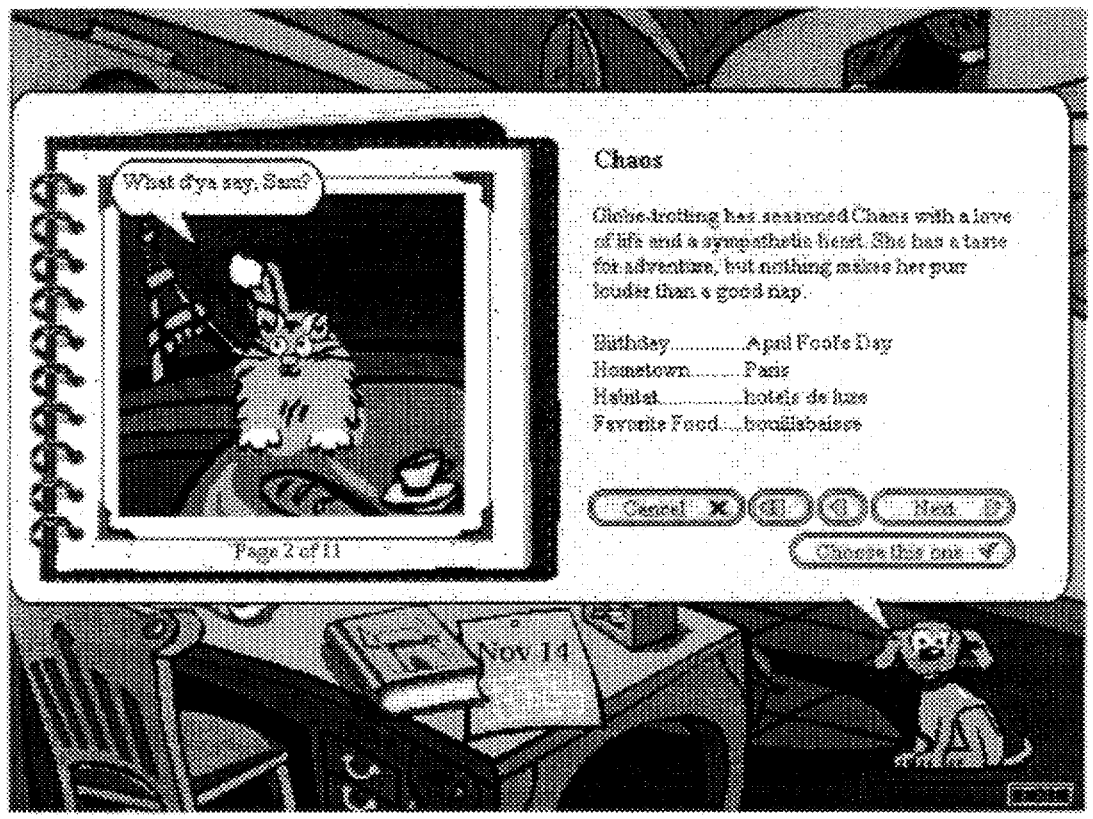
FIG. 5 is a diagram of an example of the user interface provided by the preferred embodiment of the present invention to enable a user to select a personal character.

The software development platform 24 provides a user with a choice from a number of different personal characters. The shell 30 provides a dialog that allows the user to select the personal character that the user desires. FIG. 5 illustrates an example of the user interface that is provided for selecting a personal character. The user interface is organized as a photobook, where each page shows the snapshot of the character and information about the character. Speech balloons are provided that have controls for selecting or rejecting the viewed character.

Figure 6:
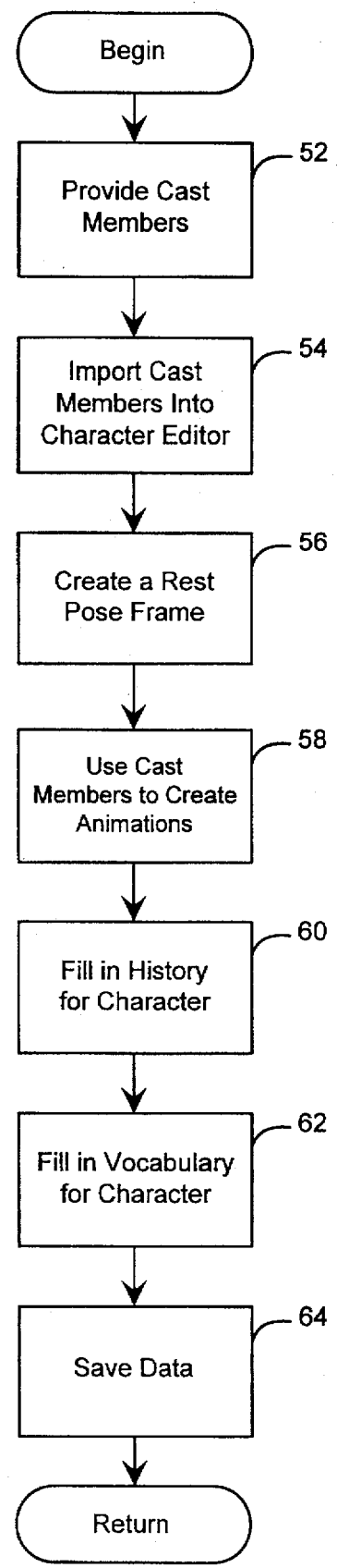
FIG. 6 is a flow chart of the steps performed by the preferred embodiment of the present invention to create a new character.
Figure 7:
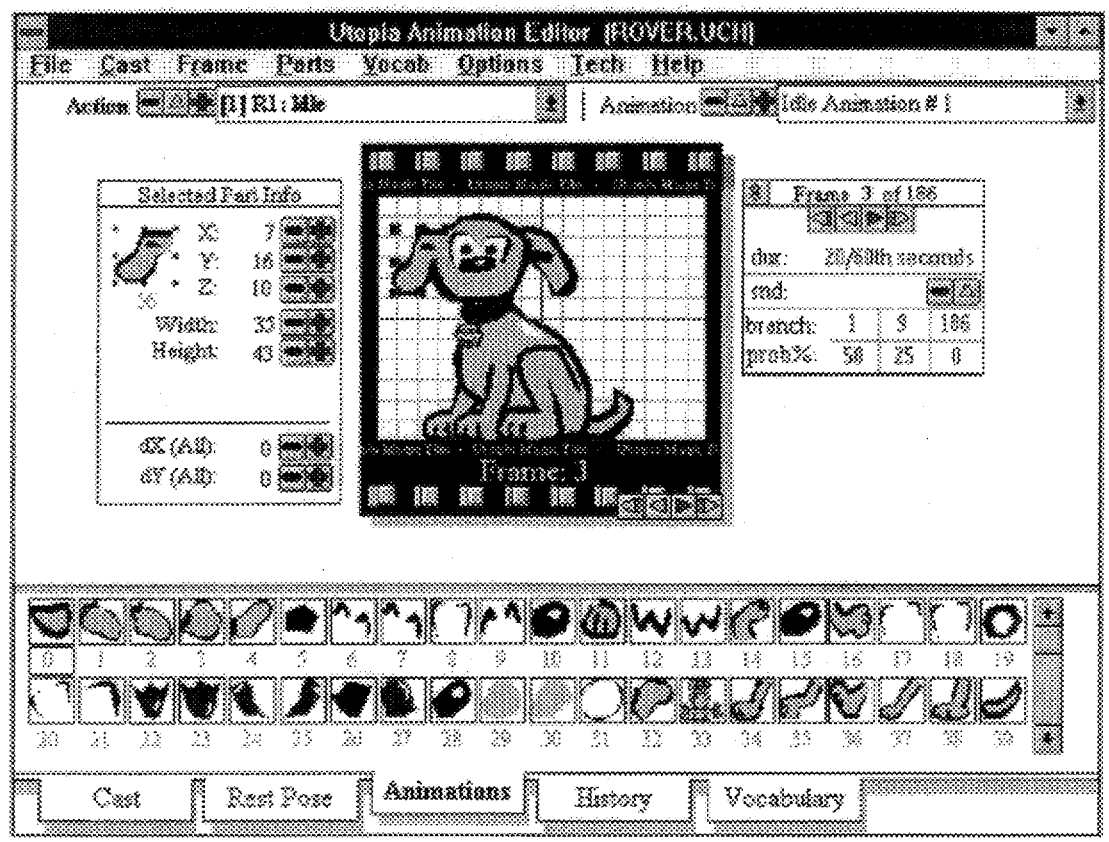
FIG. 7 is a diagram depicting a sample screen of a character editor of the preferred embodiment of the present invention.

The software development platform 24 also provides a character editor as part of the services 26 that allows a user to create new characters. FIG. 6 is a flow chart showing the steps performed to create a character using the character editor. FIG. 7 shows an example screen shot of the character editor in use. Initially, the user must create cast members (i.e., generate bitmaps for the cast members) or locate a file that holds cast members (step 52 in FIG. 6). Cast members are the graphical pieces of a character. For example, the cast members of a dog personal character (labeled 20–39) are shown in FIG. 7. Cast members, the various parts of the dog, include the dog's head, eyes and snout (cast members 20–22) and the dog's eyes (cast members 23–28). These cast members are stored as either bitmaps or metafiles. In the preferred embodiment of the present invention, the cast members are stored as metafiles to minimize memory requirements for the cast members and animations, and to all smooth display at differing resolutions.

Once the user has provided cast members, the cast members are imported into the character editor (step 54 in FIG. 6). This allows the character editor to gain access to the cast members. The character editor is then used to create a rest pose frame from the cast members (step 56). The rest pose frame is an animation frame showing the character at rest. Each animation begins and ends with such a rest pose frame.

The character editor is also used to produce animations which include collections of video frames that are played in order to create the illusion of movement by the character. Each frame holds the video data necessary to display the character in a given position. Sound may be added to the animation. For example, in FIG. 7 the character editor is being used to create frame 3 of an animation. The sound is stored in separate sound frames. The sounds are stored as waveforms that may be replayed along with the sequence of video frames. Alternatively, voice synthesis techniques may be employed to generate sound.

Figure 8:
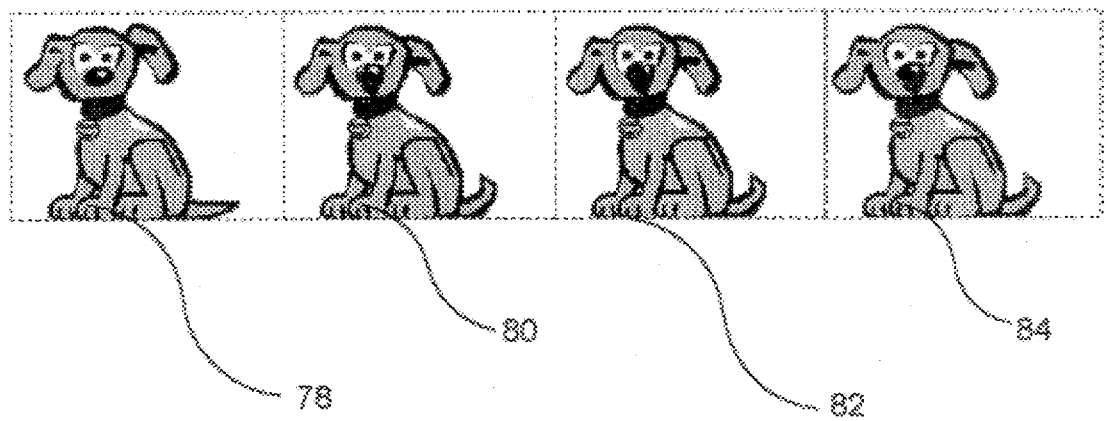
FIG. 8 is a diagram illustrating an exemplary video frame sequence for an animation in accordance with the preferred embodiment of the present invention.

FIG. 8 shows a sequence of video frames 78, 80, 82 and 84 that are part of an animation for the dog personal character. Although the animation that is shown in FIG. 8 is two dimensional, those skilled in the art will appreciate that the characters may also have three-dimensional animations. Once a rest pose frame has been created (step 56), the cast members are used to create the remaining frames of the animation (step 58). As can be seen by examining FIGS. 7 and 8, the rest pose frame 78 was created using cast members. Similarly, frame 80 is created using other cast members. For personal characters, a separate animation is provided for each designated action that the character may perform or for each command to which the character is responsive.

Once the animations are created (step 58), the history data 46 is interactively obtained from the user for the newly created character. The character editor provides edit boxes to edit the personal information stored in the history data 46. In addition, the snapshot of the character stored in the history data 46 may be manipulated so as to specify a metafile or a bitmap that holds as the snapshot of the character.

The vocabulary data 44 of the character is then interactively obtained from the user (step 62). Lastly, the obtained data is saved in the data file 39 for the character (step 64).

Figure 9A:
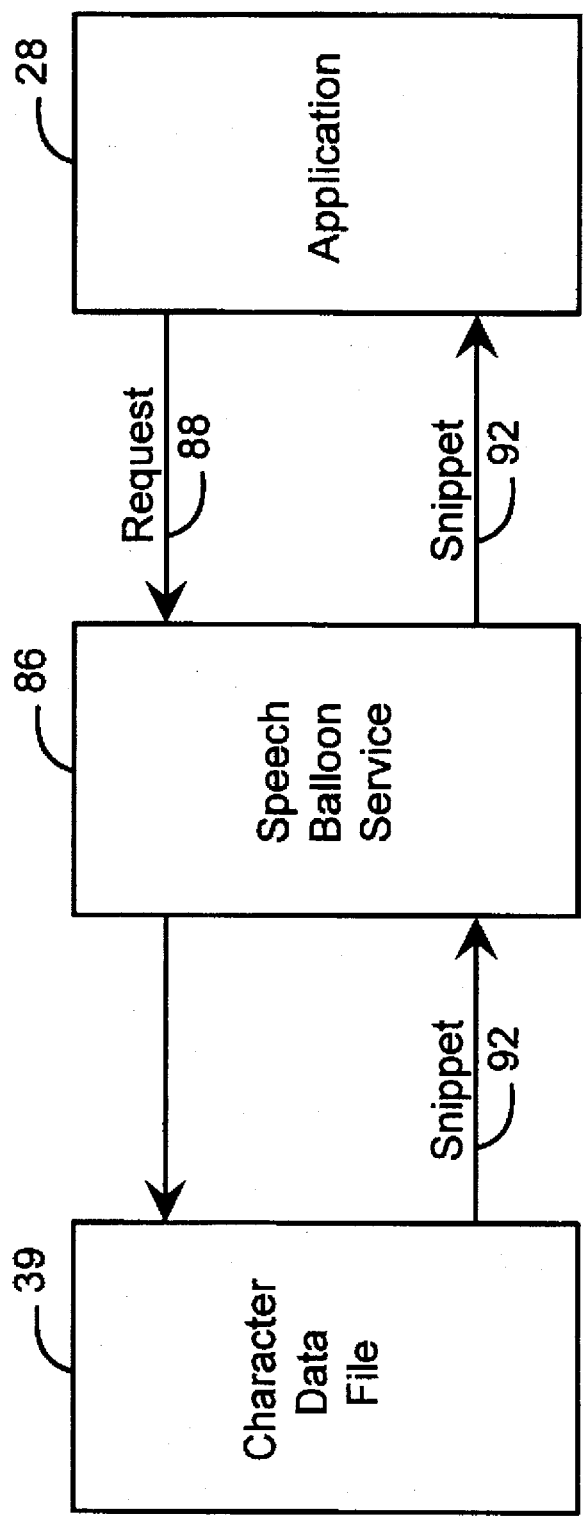
FIG. 9A is a block diagram illustrating the interaction between an application, a speech balloon service and the character data file in obtaining a vocabulary snippet in the preferred embodiment of the present invention.

The vocabulary data 44 stored in the data file 39 is used to display text within a speech balloon of a character. A speech balloon service is provided as part of the services 26 (FIG. 1) of the software development platform 24. The role of the speech balloon service is to retrieve vocabulary snippets from the vocabulary data 44 held within the data file 39. The retrieving of vocabulary snippets will be described in more detail below relative to FIGS. 9A and 9B. The retrieved snippets may also act as input to a voice synthesis portion of the system that produces corresponding audio output.

Vocabulary snippets are provided for a number of different purposes. Each purpose has an associated snippet name. For each snippet name, there may be up to 30,000 snippets provided. For example, the exclamation snippet name may include "On my!", "Wow!" and "Excellent!" as snippets, which express a character's excitement. The snippets stored under each snippet name are indexed to permit easy access.

Figure 9B:
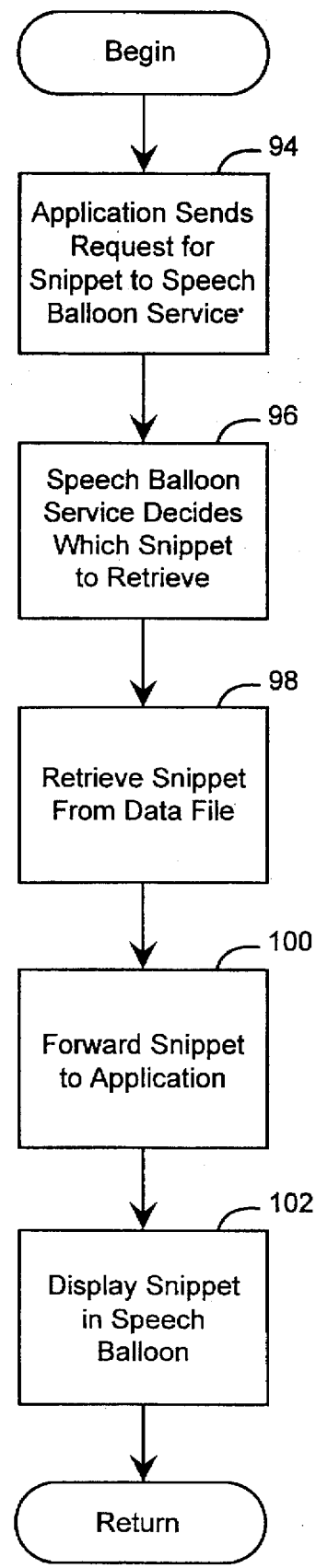
FIG. 9B is a flow chart illustrating the steps performed by the preferred embodiment of the present invention to obtain and display a vocabulary snippet in a speech balloon.

System services that are provided as part of the services 26 draw the speech balloon at the request of an application 28. The contents of the speech balloon (i.e., the text and controls contained therein) are the responsibility of the application. FIG. 9B shows a flow chart of the steps performed by an application to obtain a text snippet. Initially, the application 28 (FIG. 9A) sends a request 88 for a snippet by name to the speech balloon service 86 (step 94 in FIG. 9B). As there may be multiple snippets stored for the requested snippet name, the speech balloon services 86 must decide which snippet to retrieve from the character data file 39 (step 96 in FIG. 9B). The speech balloon service 86 may, for example, use a weighted random method to determine which snippet to retrieve. For example, a random value may be generated. The random value is then used as an index for retrieving a snippet 92 amongst those stored under the snippet name. Thus, for instance, the snippet used to express character excitement varies so as to make interaction with the character more interesting.

The indexed snippet 92 is then retrieved from the character data file 39 by the speech balloon service 86 (step 98 in FIG. 9B). The speech balloon service 86 forwards the snippet 92 to the application 28 (step 100 in FIG. 9B). The application 28 displays the snippet in a speech balloon (step 102 in FIG. 9B).

Figure 10A:
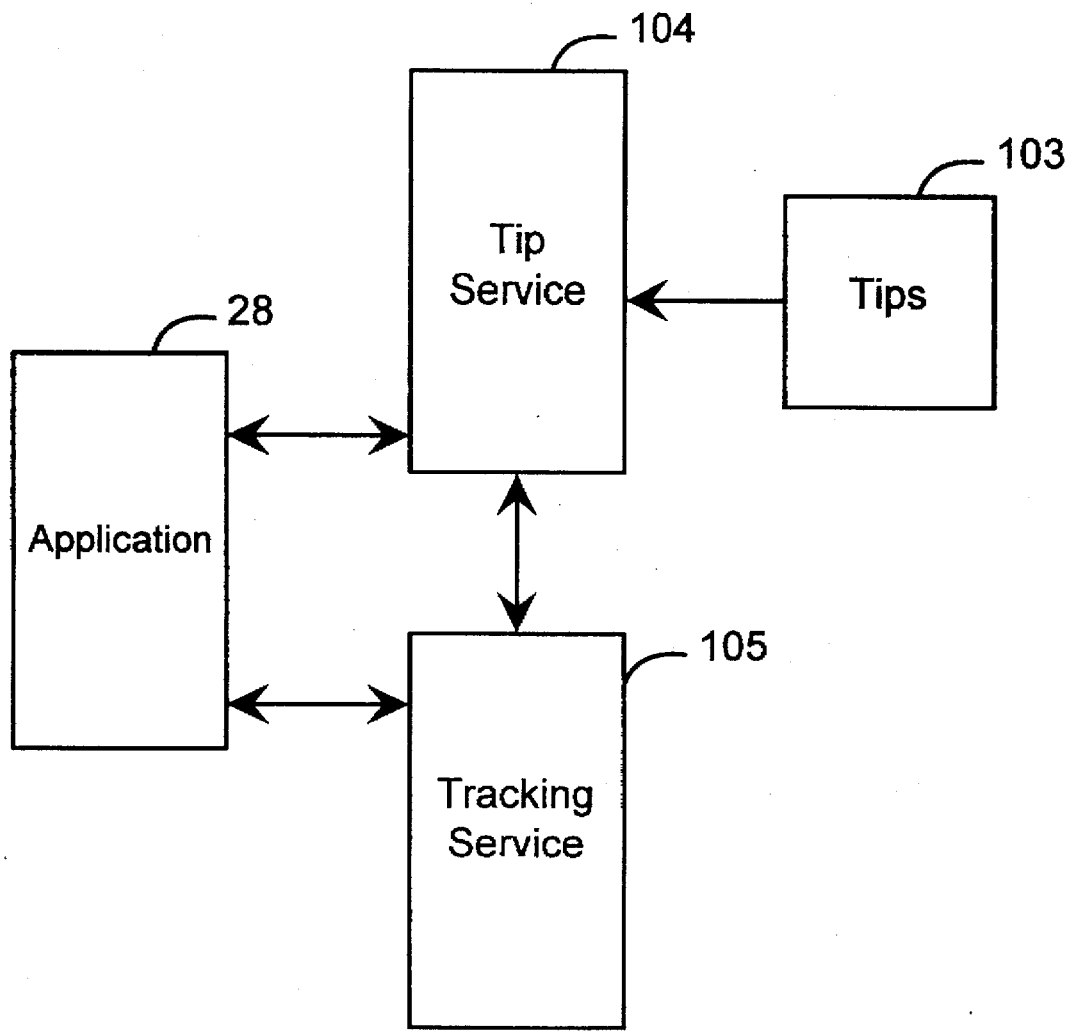
FIG. 10A is a block diagram illustrating the interaction between an application, a tracking service and a tip service in deciding whether to display a tip in the preferred embodiment of the present invention.

The speech balloons displayed by the preferred embodiment of the present invention may include tips. Tips are useful information provided by a character to assist the user in performing a task. Typically, a tip is displayed when a user does something wrong. Tips may, however, be triggered by other events to help the user avoid this pitfall in the future. To provide such tips, the preferred embodiment includes a tip service 104 and a tracking service 105, as shown in FIG. 10A. The tip service 104 and the tracking service 105 are part of the system services 26 and interact with the application 28 to guide the application in deciding when to provide tips. The tip service 104 has access to a number of tips 103 for which it may display. The tips are stored in data structures that are provided from the application 28 when it is initially loaded.

A separate data structure is stored for each tip. The data structure holds the number of lives for the tip, the sensitivity index of the tip (0–48), an identifier for the tip and a specification of how to display the tip. The sensitivity index specifies some measure of how frequently the user must perform a triggering event before a tip will be displayed. The sensitivity index reflects an empirically derived estimate of how frequently a tip should be displayed based on the number of occurrences of a triggering event. The sensitivity index is used along with the helpfulness index of the personal character to determine when a tip is to be displayed. This calculation will be discussed below. The number of lives value stored for a tip specifies how may times a tip will be displayed before it will no longer be displayed.

The tip service 104 is responsible for retrieving the tip and providing the necessary information to display the tip in a speech balloon. The tracking service monitors user activities to determine when to display the tip.

Figure 10B:
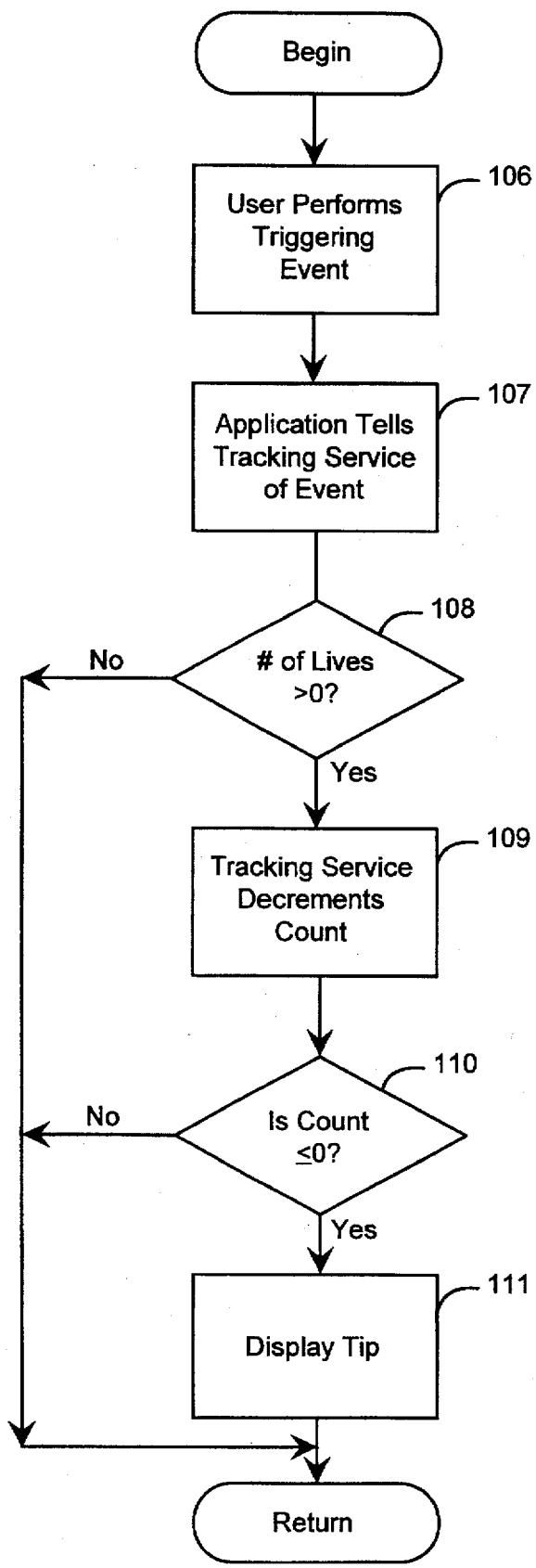
FIG. 10B is a flow chart illustrating the steps performed in deciding whether to display a tip in the preferred embodiment of the present invention.

FIG. 10B is a flow chart illustrating the steps that are performed to determine whether to display a tip. Initially, a user performs a triggering event (step 106). For example, suppose that a user is typing a word processing document and manually inserts carriage returns when the word processing program will automatically insert a carriage return. The entering of a manual carriage return by the user is a triggering event.

The application 28 then tells the tracking service 105 of the occurrence of the triggering event (step 107). As was mentioned above, each tip stores a value that specifies the number of lives of the tip. Each time that the user performs the correct action (i.e., an action that if performed incorrectly would trigger a tip), the number of lives is decremented by 1. In addition, when the tip gets displayed, the number of lives is also decremented by 1. Before a tip may be displayed, a determination is made whether the number of lives is greater than 0 (step 108). If the number of lives is greater than zero, the tracking service 105 decrements the count it maintains (step 109).

In contrast, if the number of lives is less than or equal to 0, the tip is not displayed, because the number of lives have been extinguished. The number of lives can be incremented or reinitialized. For example, the number of lives may be reinitialized periodically if the user has not used the system or if the tip has not been displayed for a predetermined period of time.

For each user and tip pair, a separate count is maintained. The count is initially set equal to the sensitivity index and is decremented by the helpfulness index of the personal character each time that the triggering event occurs. For instance, suppose that the sensitivity index for a tip is "18" and the helpfulness index for the personal character is "6". Each time the triggering event occurs, the count is decremented by "6".

Whenever the count is decremented, the tracking service 105 checks whether the count is less than or equal to 0 (step 110). In the example given above, the third time the triggering event occurs, the sensitivity index equals 0. In the two previous occurrences, in step 110 it is determined that the count is not less than or equal to 0 and, hence, the tip is not displayed. If the count is greater than 0, the tip is displayed (step 111).

The tip is displayed by the tracking service 105 telling the tip service 104 to display the tip. The tip service 104 provides requisite information to the application 28 to display the tip in the speech balloon. As mentioned above, data structures for the tip are provided on a per-application basis. It should be appreciated that the tips may be applied across application boundaries. For instance, certain tips may be applicable to different applications. Accordingly, the tip may be applied across application boundaries.

Figure 11A:
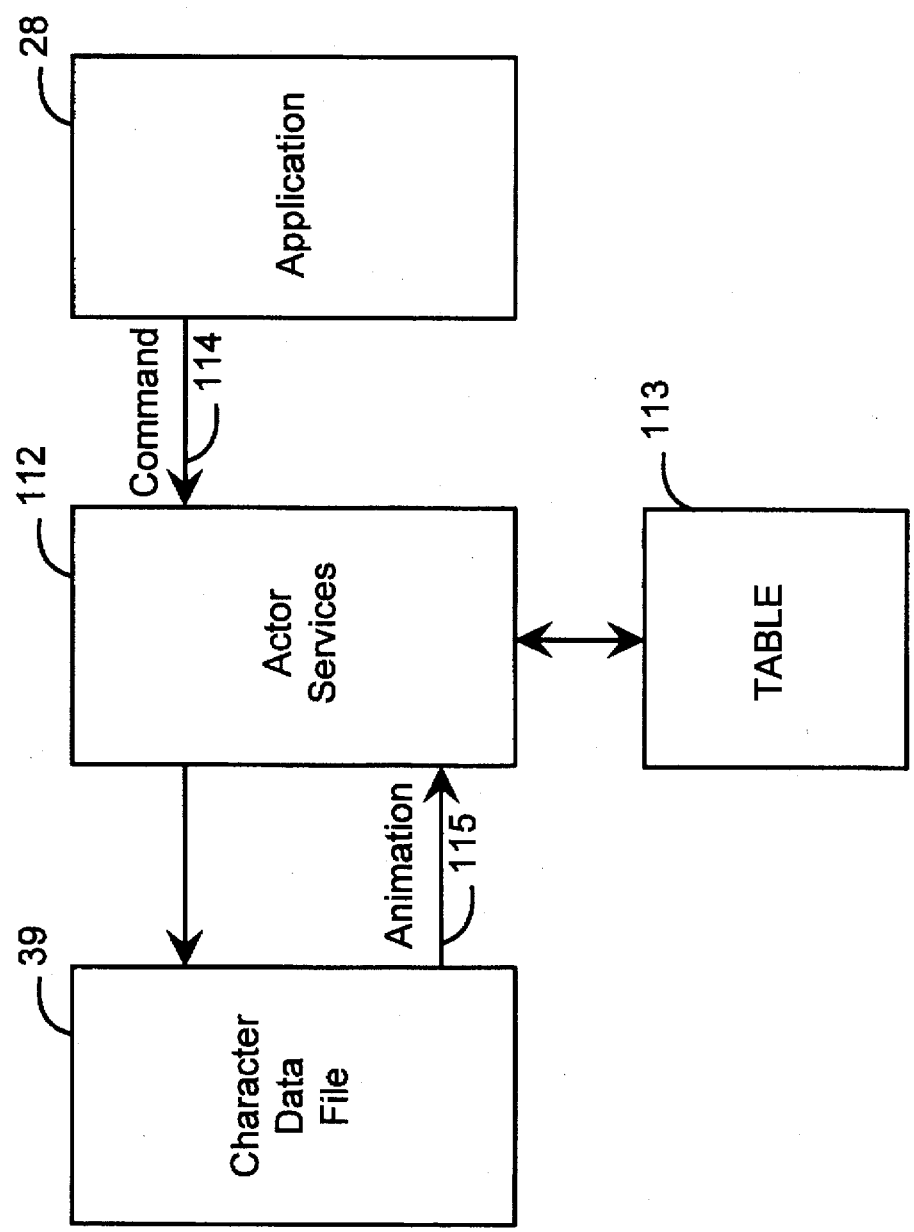
FIG. 11A is a block diagram illustrating the interaction between an application, actor services and the character data file in playing an animation in the preferred embodiment of the present invention.
Figure 11B:
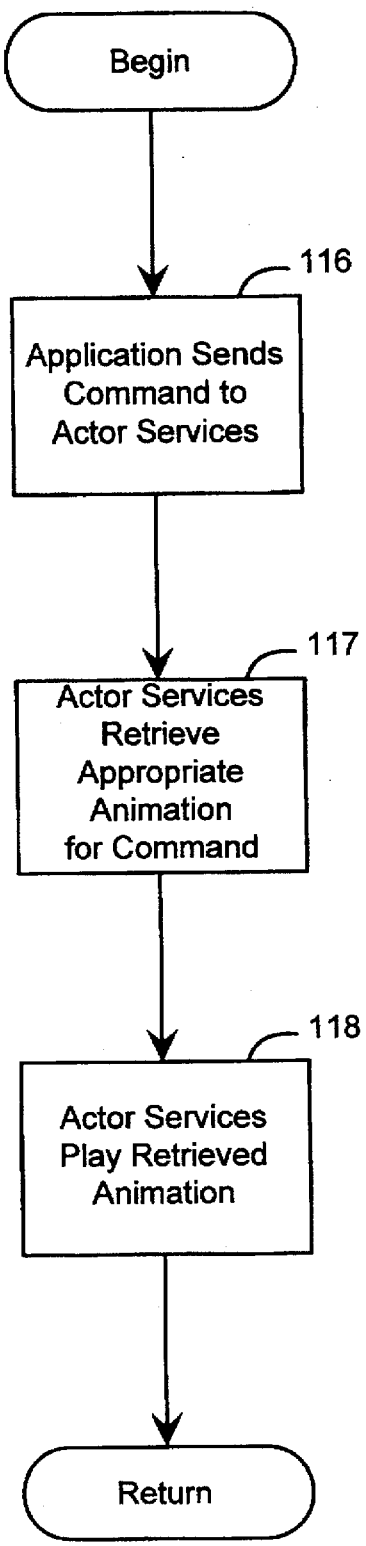
FIG. 11B is a flow chart illustrating the steps performed in the preferred embodiment of the present invention to play an animation.

The services 26 that are provided in the software development platform 24 (FIG. 1) also include actor services for animating the characters. FIG. 11A shows the components that play a role in playing such animations, and FIG. 11B shows a flow chart of the steps performed to play such an animation. Initially, an application 28 sends a command 114 to actor services 112 to request that the character perform a particular action (step 116 in FIG. 11B). The actor services 112 consult a table 113 that associates commands with animations. In particular, the table 113 tells the actor services 112 what animation to retrieve for the given command 114. The actor services 112 then retrieves the animation that is appropriate for the command 114 (step 117 in FIG. 11B). The retrieved animation 115 is played by actor services 112 (step 118 in FIG. 11B). The actor services 112 include timing mechanisms that allow the animation to be played properly and smoothly. In particular, a system timer is provided and set to specify when a next frame in an animation sequence is to be played. The actor services calculate which frame to next display and set the timer accordingly.

The animations 40 stored within the data file 39 includes video frames as well as duration and timing information. The animations 40 also may include audio information and conditional branching information. The conditional branching information allows the play sequence of frames to vary so that, under certain conditions, the frames are played at a different sequence than they are normally played. The idea behind the conditional branching is to make sure that the same animation is not played repeatedly. The conditional branching mechanism uses a random number generator that generates a random number in the range 0–8000 in hexadecimal notation. The range of possible values of random number is divided into subranges, wherein each subrange is associated with a corresponding branch. The size of the subrange depends on the probability that the associated branch will be taken. Thus, for example, a branch with an 80 percent probability of occurring is assigned a subrange that constitutes 80 percent of the range between 0 and 8000 (hex). It is then determined which subrange the random number falls in, and the associated branch for the subrange is played at the point of the conditional branch.

The conditional branching is particularly useful for the idle animation. The idle animation is displayed whenever no other commands have been send to the actor services 112. It should be appreciated that the idle animation may be requested by applications 28 and by the shell 30. More generally, the application 28 shown in FIG. 11A and the application 28 shown in FIG. 9A may be the shell 30 or other applications. Since the idle animation is shown so frequently, the conditional branching is desirable within the idle animation to vary the animation sequence that is shown to the user.

In the preferred embodiment of the present invention, characters are aware of users and the surrounding environment. In particular, characters are aware of the age and gender of the user and may be aware of additional user information derived from user tracking software. For instance, a character may refer to a female user as "Mme." and may refer to a male user as "Sir". Characters are also aware of their surrounding environments so that they are aware of current date and time. For example, if a user logs in during the morning, the character may greet the user with "Good morning". In contrast, if the user logs on in the evening, the character may greet the user with "Good evening". As a further example, certain actions that a character performs may be triggered by timing. For example, a character may be developed so as to produce a speech balloon that says "Time for lunch" when the clock reads 12 noon.

Through the use of personal and specialist characters, the preferred embodiment of the present invention makes the user interface of the shell much more easy to use. These characters are especially well adapted to be used by novice users without the need for extensive training. Moreover, these characters are consciously designed to be non-intimidating to users. As such, users feel more at ease using the software platform of the preferred embodiment than using conventional software products.

The above discussion has focused on characters and their use within the preferred embodiment of the present invention. The discussion below focuses on the home user interface provided by the shell 30 (FIG. 1) of the preferred embodiment of the present invention.

Figure 12:
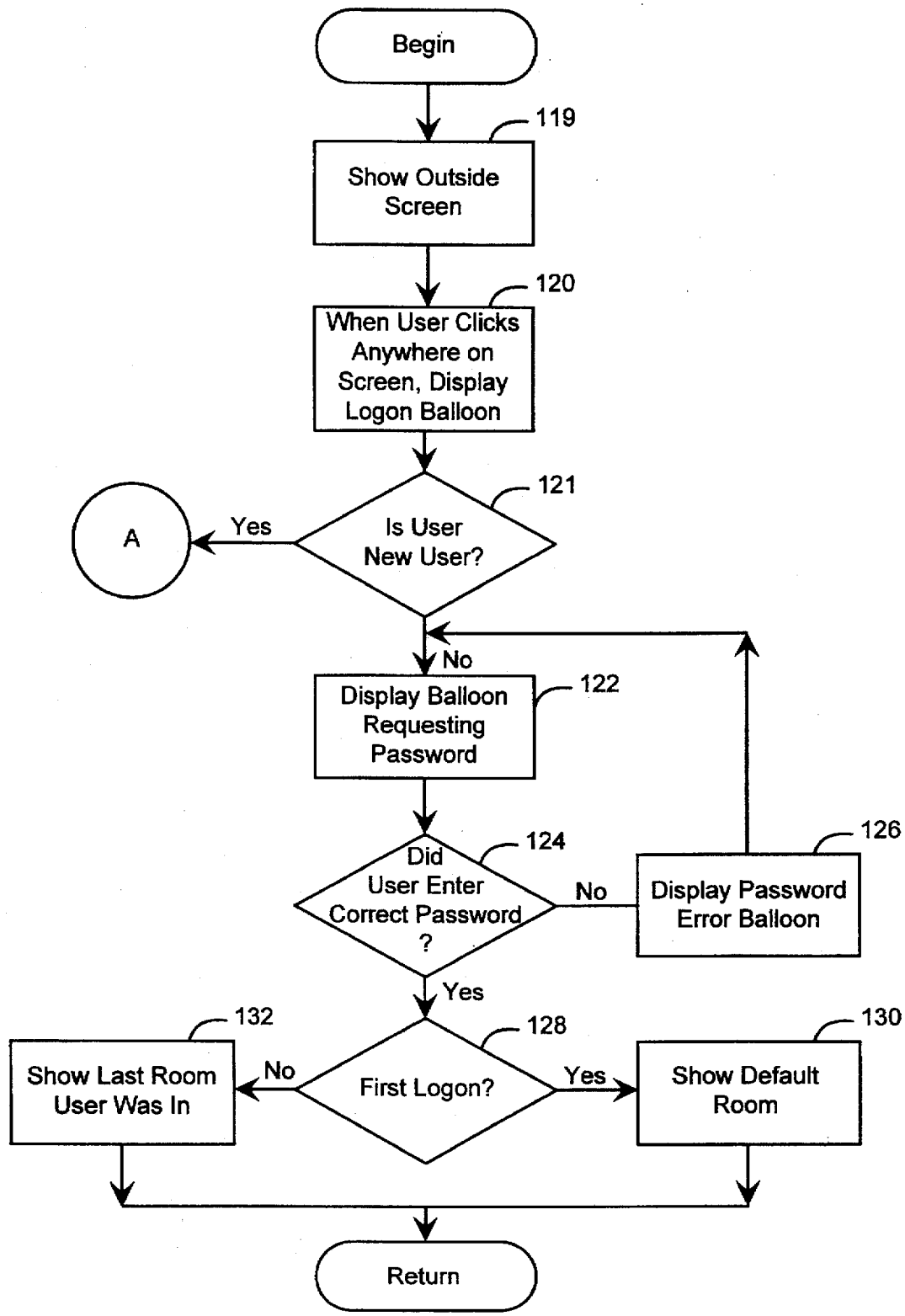
FIG. 12 is a flow chart illustrating the steps performed when a known user attempts to log on in the preferred embodiment of the present invention.
Figure 13:
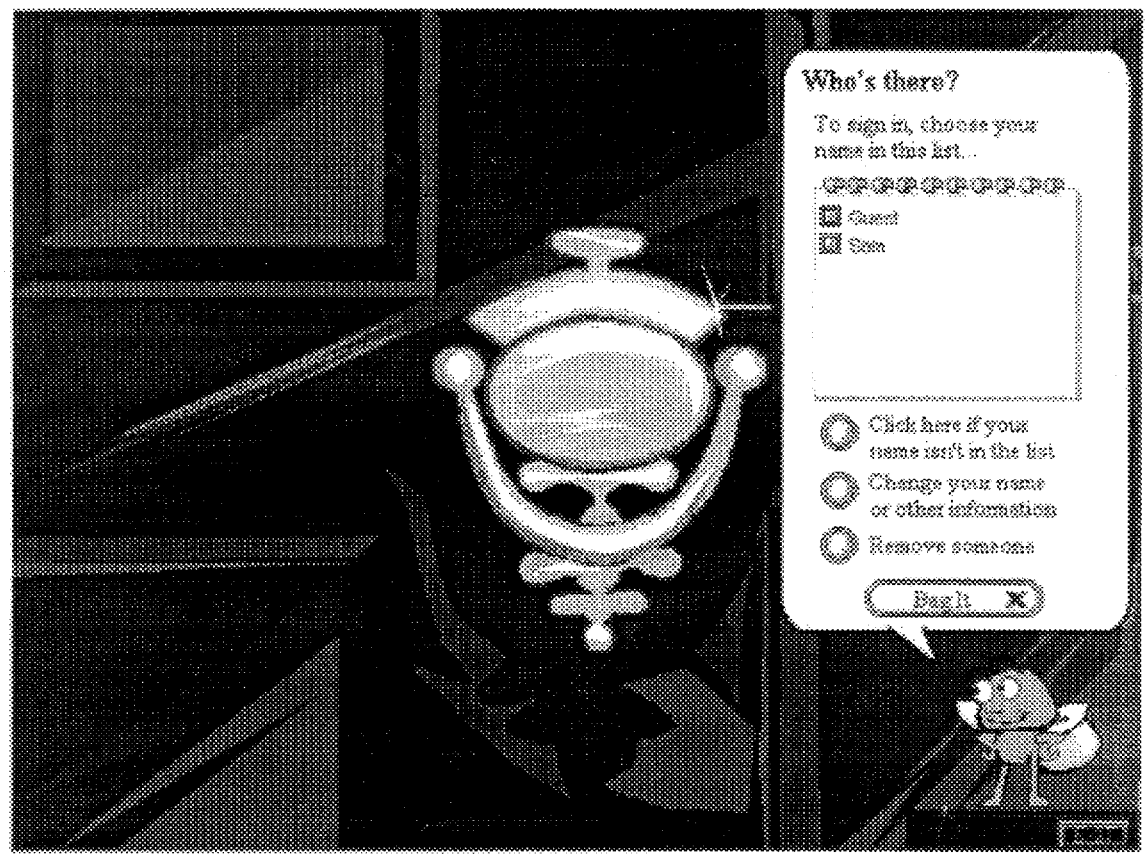
FIG. 13 is an example of an outside screen used in the preferred embodiment of the present invention.

The shell 30 provides the user with the ability to log on and gain access to the rooms that constitute his "home". FIG. 12 is a flow chart of the steps that are performed during a log-on sequence in the preferred embodiment of the present invention. Initially, an outside screen depicting a front door of the home of a user is shown on the video display 16 (step 119 in FIG. 12). When the user clicks the mouse 18 when a cursor is anywhere on the screen that depicts the front door of the home, a log-on balloon is displayed as shown in FIG. 13 (step 120). The log-on balloon includes a list of options where the user can specify whether he is a new user or not (see step 121 in FIG. 12). If the user is not a new user, a balloon is displayed that contains an edit box for requesting a password (step 122). After the user has entered the password, a determination is made whether the user entered the correct password or not (see step 124). If the user did not enter the correct password, an error balloon is displayed (step 126), and then the user is requested to again enter his password (step 122). If, instead, the user enters the correct password, it is determined whether the user has logged on previously or not (see step 128). If the user has logged on previously, the last room that the user was in is displayed on the video display 16 (step 132 in FIG. 12). On the other hand, if this is the first time the user has logged on, a default room of the home (e.g., the study) is displayed on the video display 16 (step 130 in FIG. 12).

Figure 14:
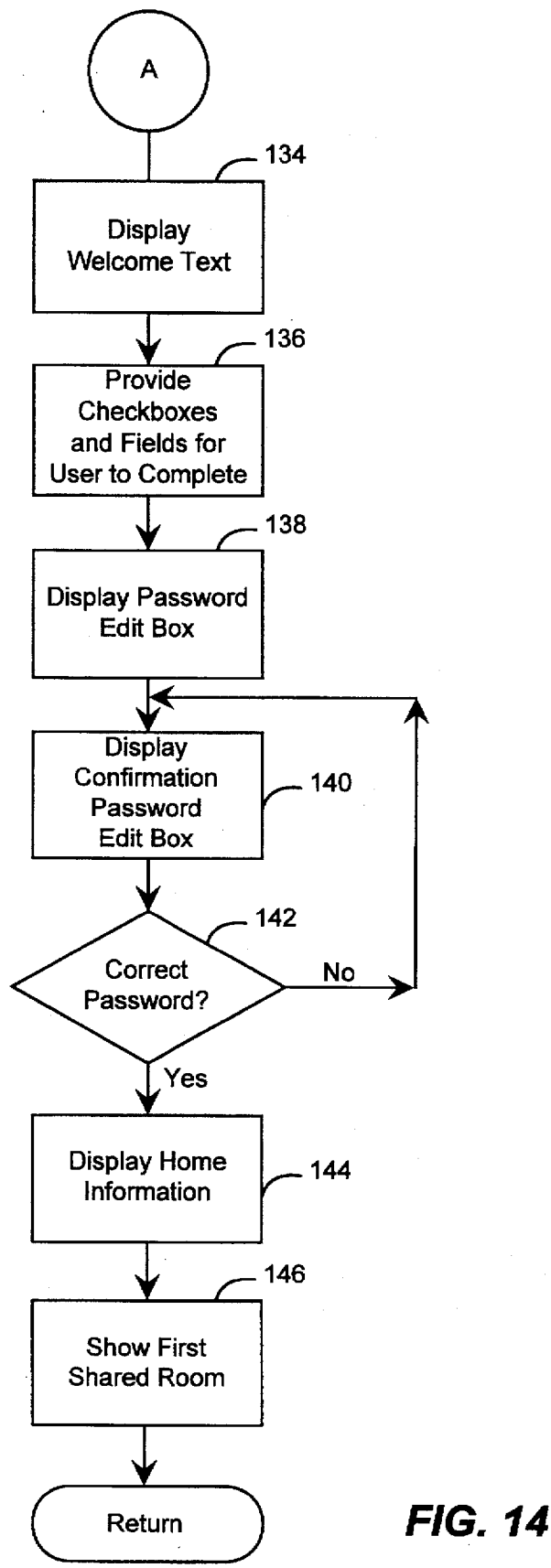
FIG. 14 is a flow chart illustrating the steps that are performed when a new user attempts to log on in the preferred embodiment of the present invention.

If in step 120, it is determined that the user is a new user, the steps shown in FIG. 14 are performed. Initially, text is displayed that welcomes the user (step 134 in FIG. 14). The shell 30 then displays check boxes and fields for the user to complete (step 136). The user selects check-boxes and enters requested information in the fields. A password edit box is then displayed (step 138). The user enters the proposed password into the edit box. A confirmation password edit box is subsequently displayed to confirm the password that the user has entered (step 140). If the user enters a different password than he first entered (see step 142), the confirmation edit box is again displayed (see step 140). In contrast, if the user enters the correct password, descriptive information about the home user interface is displayed (step 144). Lastly, the user enters the home and is shown the default room of the home (step 146).

Figure 15:
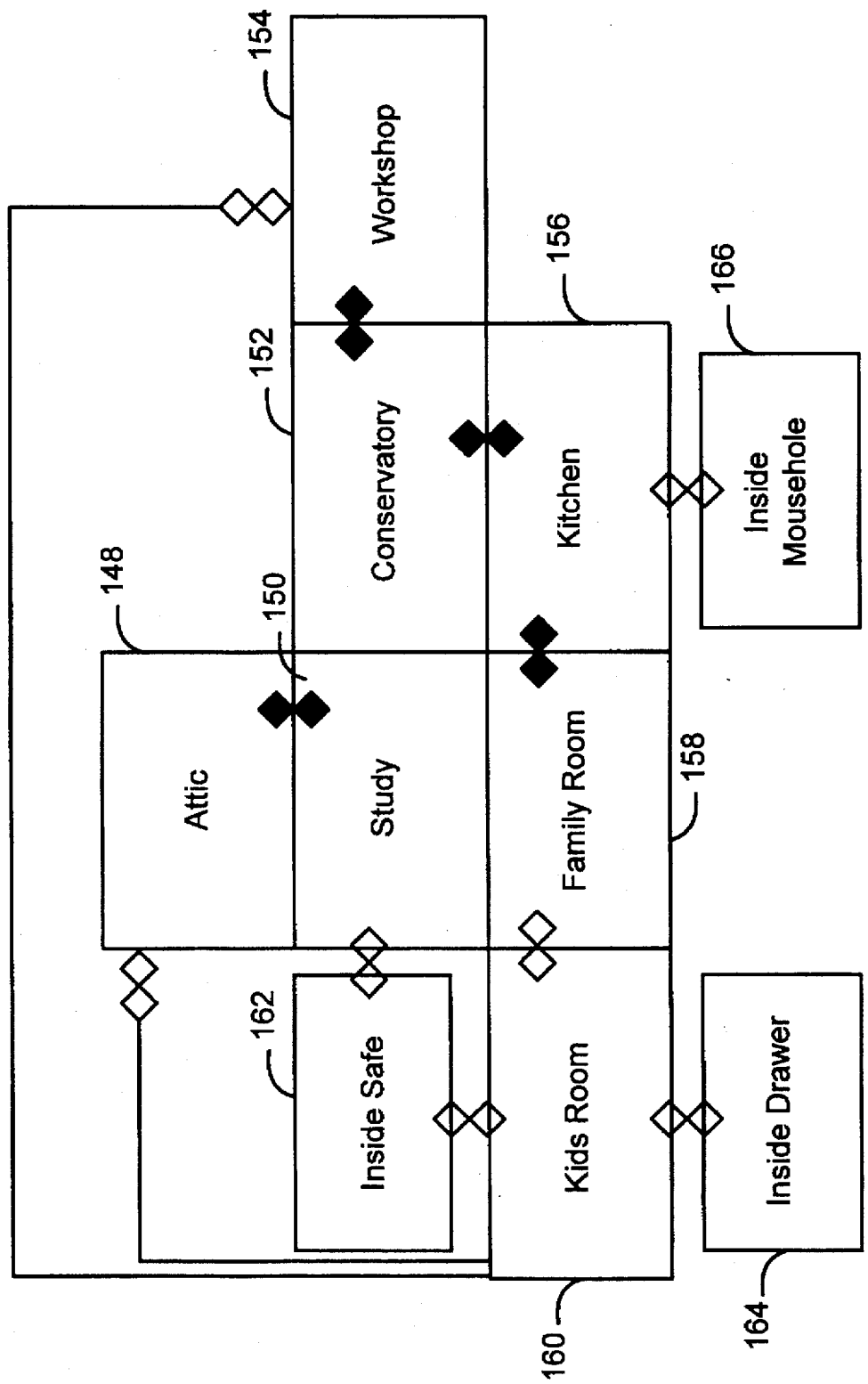
FIG. 15 is a diagram illustrating exemplary layout for the rooms of a home in accordance with the preferred embodiment of the present invention.

The home that is provided by the software development platform 24 (FIG. 1) is a series of rooms which are connected to each other via passageways. The passageways provide a mechanism for a user to move between the rooms of the home. Passageways may be doors or other types of passageways. FIG. 15 depicts the rooms that are included in a typical house in accordance with the preferred embodiment of the present invention. The home shown in FIG. 13 includes an attic 148, a study 150, a conservatory 152, a workshop 154, a kitchen 156, a family room 158 and a kids room 158. The home also includes the inside of a safe 162, the inside of a drawer 164 and the inside of a mouse hole 166. The darkened arrows shown in FIG. 13 indicate doorways that connect the rooms. The lighter arrows indicate passageways that are not doorways.

When a room is displayed, the room occupies the full screen of the video display 16. Each room contains walls, a ceiling, a floor and a set of objects. The walls cannot be moved or resized. The nature of the room determines which objects are included in the room by default. For example, study 150 includes a desk and a lamp. Rooms cannot be changed into other types of rooms. For example, a kitchen cannot be changed into a family room. Rooms can be added and deleted from the home. As will be described below, the shell 30 provides a vehicle for making such changes.

Rooms are made up of walls, a ceiling and a floor. Objects are placed on the walls and floor of the room. All objects other than the walls, the ceilings and the floors can be moved within the room and can be resized. FIG. 14 shows an example of a study 32 that includes these elements.

The shell 30 (FIG. 1) provides a default home style. The default home style is the contemporary home style. The home style dictates the appearance of objects within the respective rooms of the home. In the preferred embodiment of the present invention, four home styles are available. These home styles are: contemporary, castle, retro- and post-modern.

Each window in the home has an outside view. Animations may be provided as part of this outside view or static images may be provided. For example, a window may show an outside view of the ocean, scenes from Paris or scenes from a desert.

Figure 16:
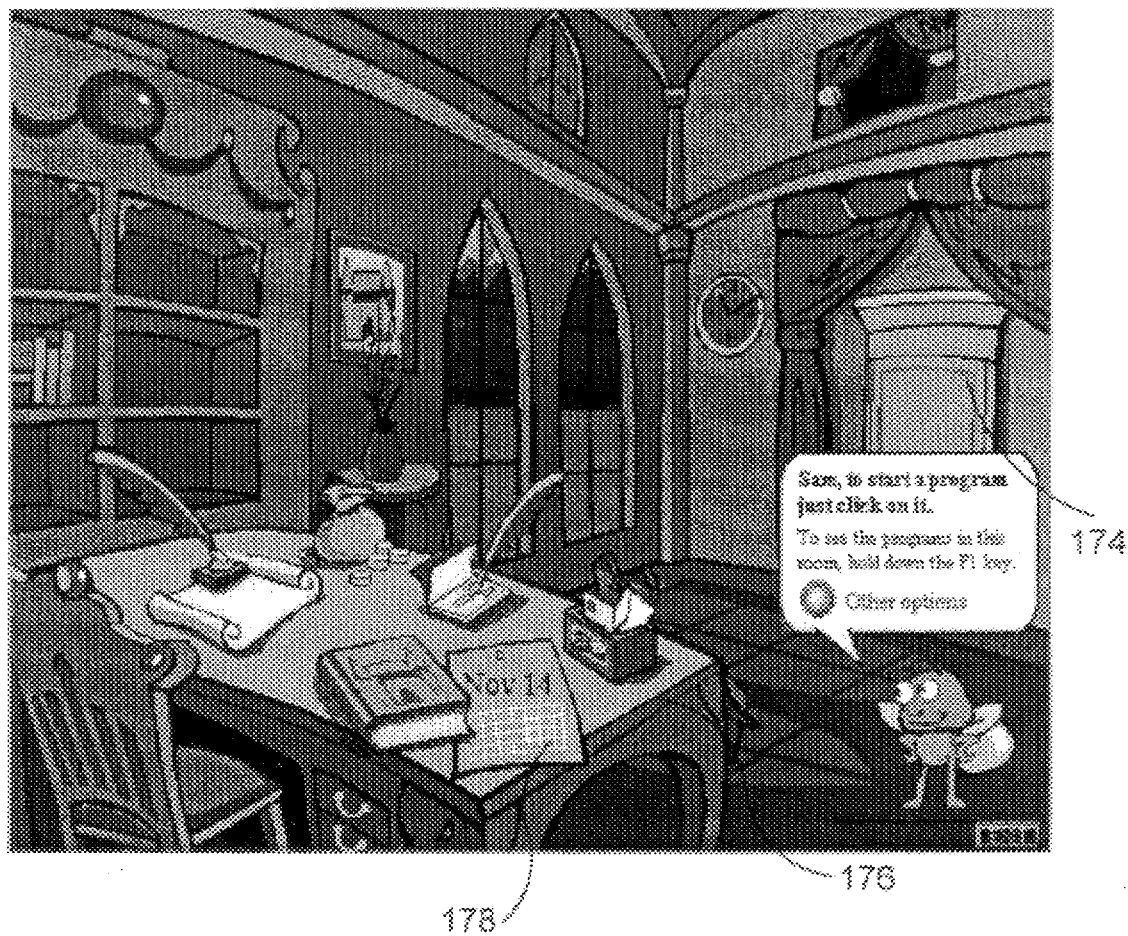
FIG. 16 is an example of a castle-style study generated in accordance with the preferred embodiment of the present invention.

To help illustrate the difference between home styles, FIG. 16 shows a study in the castle home style. The study shown in FIG. 16 may be contrasted with the contemporary study shown in FIG. 2. Each of the studies contains many of the same objects, but the appearance of the objects differ according to the style.

A user may change the style of a room. The shell 30 provides a balloon that provides a user the option of changing the style of the room. The entire style of a house may be changed by changing the style of each of the rooms to the desired new style.

Figure 17A:
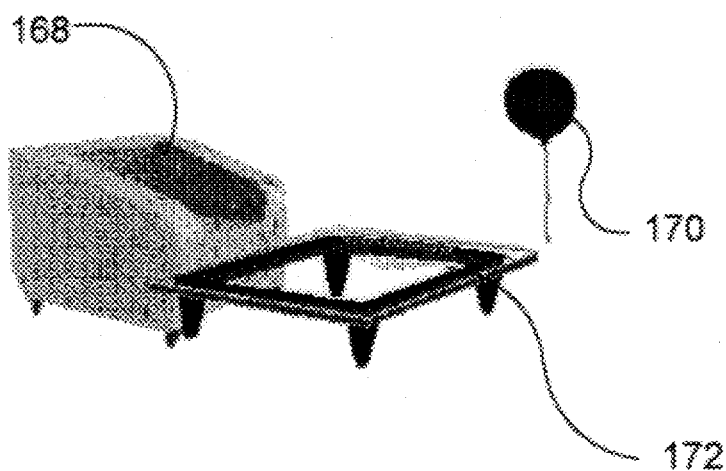
FIG. 17A illustrates the appearance of graphical objects in a room when a contemporary style is chosen for the room in accordance with the preferred embodiment of the present invention.
Figure 17B:
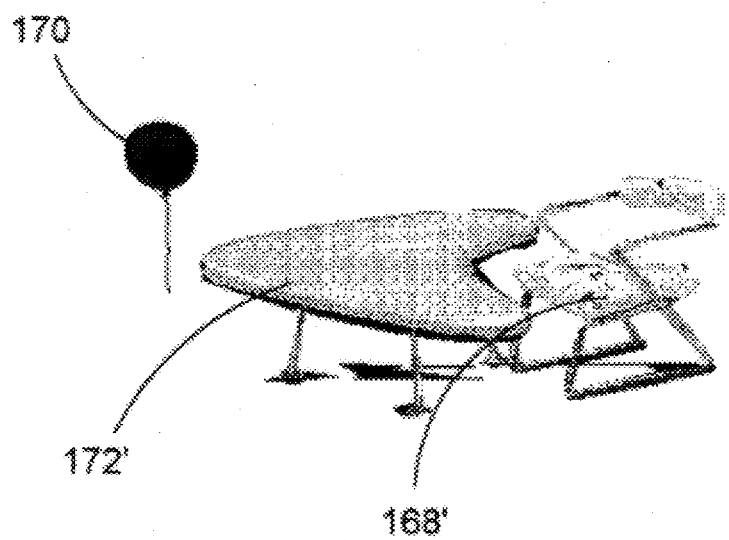
FIG. 17B is a diagram illustrating graphical objects for a room when a space-style is chosen for the room in the preferred embodiment of the present invention.

FIGS. 17A and 17B illustrate the change in appearance of objects when the style of the room is changed from contemporary to a space style. FIG. 17A shows a couch 168, a balloon 170 and a coffee table 172 for a room in the contemporary home style. When the style of the room is changed to the space style as shown in FIG. 17B, the appearance of the couch 168' is changed, as is the appearance of the coffee table 172'. The appearance of the balloon 170, however, does not change. This is because there is no new image for the balloon in the new style. In changing room styles, the preferred embodiment of the present invention changes the style of each object that has an image in the new style, but it does not change an object that does not have an image in the new style.

The default home includes a default set of rooms and a default location for objects within each room. Each room has at least one passageway. The door 174 shown in FIG. 15 is an example of a passageway. A passageway is a special kind of object that when clicked on (i.e., when the cursor points to the object and the mouse button is quickly pressed and released) presents the user with a balloon. The balloon provides the option to jump to a specified room or to change the passageway. If the user wishes to go straight to the passageway to the new room, the user double clicks on the passageway.

The objects provided in each room are of three varieties: passive objects, active objects and passage-way objects. The passage-way objects have been discussed above. Passive objects are objects that are shown in a room merely for decorative purposes and do not provide a mechanism for activating an application or moving to a new room. Active objects provide extended properties and allow a user to invoke an application. Table 176 is an example of a passive object. Calendar 178, in contrast, is an example of an active object. The user positions the mouse on the calendar, double clicks and the calendar program is invoked.

The objects may include their own code for handling the display of the objects, for handling the user interface for the object and for providing additional functionality for the object. For example, a cellular phone object might be provided that follows the user from room to room. The cellular phone object flashes a light when the user has received voice mail and presents a custom balloon that lets you listen to messages or speed dial numbers when the object is clicked upon.

It should also be appreciated that objects may be animated just like characters. Such animations may include sounds, commands and conditional branching as described above for the characters. The more traditional objects are merely still images.

Those skilled in the art will appreciate that the real world metaphor adopted by the preferred embodiment of the present invention may be extended to provide alternative user interfaces that differ from the home interface. For example, the interface may resemble a town or city.

The preferred embodiment of the present invention provides a user interface that is easy to use, non-threatening and helpful. Users readily accept the home metaphor provided by the user interface. The characters provided in the preferred embodiment act as friendly centralized services of assistance.

While the present invention has been described with reference to a preferred embodiment thereof, those skilled in the art will appreciate that various changes in form and detail may be made without departing from the intended scope of the present invention, as defined in the appended claims.

We claim:

1. In a data processing system having a video display, a storage for storing computer programs, a processor for running the computer programs and a service for displaying at least one animated character on the video display for use by application programs, wherein the computer programs include the application programs and a software development platform displaying a system user interface, said system uses interface including mechanisms for invoking the application programs, a method comprising the steps of:
   as part of running the software development platform displaying the system user interface on the processor,
      displaying an animated character on the video display via the service;
      outputting information to assist a user via the animated character;
   as part of running a selected one of the application programs on the processor,
      displaying the animated character on the video display via the service;
      outputting information to assist the user via the animated character; and
      replacing the animated character with another animated character in response to a request by the user, when running the program for displaying the system user interface.

2. In a data processing system having a video display, a storage for storing computer programs, a processor for running the computer programs and a service for displaying at least one animated character on the video display for use by application programs, wherein the computer programs include the application programs and a software development platform displaying a system user interface, said system uses interface including mechanisms for invoking the application programs, a method comprising the steps of;
   as part of running the software development platform on the processor,
      displaying an animated character on the video display via the service;
      outputting information to assist a user via the animated character;
   as part of running a selected one of the application programs on the processor,
      displaying the animated character on the video display via the service;
      outputting information to assist the user via the animated character; and
      replacing the animated character with another animated character in response to a request by the user, when running one of the application programs.

3. In a data processing system having a processor for running computer programs including a software development, platform a storage for storing the computer programs and a video display, a method comprising the steps of:
   with the software development platform displaying on the video display a choice of personal characters from which the user may choose;
   in response to a choice by the user of a desired personal character from the selection, assigning a desired personal character to the user by the software development platform;
   when the computer programs are run,
      displaying the desired personal character of the current user on the video display; and
      outputting information to assist the current user through the personal character.

4. The method of claim 3 wherein the step of outputting information to assist the current user through the personal character comprises the step of displaying an animation of the personal character on the video display.

5. The method of claim 3 wherein the step of outputting information to assist the current user through the personal character comprises the step of outputting help information on the video display.

6. The method of claim 3 wherein the data processing system further comprises an audio output device and wherein the step of outputting information to assist the current user through the personal character comprises the step of outputting audio information to assist the user over the audio output device.

7. In a data processing system having a video display, a method comprising the steps of:
   providing an animated personal character for a user that is displayed on the video display to assist the user in using the data processing system;
   invoking a specialized task;
   replacing the personal character with an animated specialized character that is displayed on the video display and that provides assistance to the user as to the specialized task;
   maintaining information about the user on behalf of the personal character;
   making the maintained information available to the specialized character; and
   having the character perform a task that requires access to the maintained information.

\* \* \* \* \*